United States Patent Office 2,797,997
Patented July 2, 1957

2,797,997

DETOXIFICATION OF COTTONSEED MATERIAL

Edward Eagle and Joseph W. Bremer, Jr., Chicago, Ill., assignors to Swift & Company, Chicago, Ill., a corporation of Illinois No Drawing. Application January 19, 1954,
Serial No. 405,023

8 Claims. (Cl. 99—2)

This invention relates generally to an improved process of manufacturing a detoxified cottonseed meal, and more particularly to a process which will alter highly toxic solvent-extracted cottonseed meal into a nutritious food material which can be safely fed to animals at high levels.

Cottonseed oil is commonly separated from the seed by either expression or solvent extraction. In expression, the older manner of oil recovery, the seeds are dehulled, crushed, then cooked, and finally subjected to a pressing operation to separate the oil from the meal. Cottonseed meal separated in this manner is valued as a stock feed because of its high protein content and nontoxic properties.

Solvent extraction is more effective than expression for oil recovery, but unfortunately meal from which the oil has been extracted by means of a hydrocarbon solvent is toxic when ingested by many species of animals for which it would otherwise serve as a desirable food source.

It has been known that the toxicity of solvent-extracted cottonseed meal could be lessened to some extent by further treatment. It is common knowledge that moist toasting or cooking (autoclaving) in the presence of stripping steam is effective in improving the food value of solvent-extracted meal. Other methods of lessening toxicity have been proposed, such as extraction of the pigmented bodies with halogenated organic solvents and the use of pigment solvents such as diethyl ether. While all of these methods have some tendency toward the reduction of toxic qualities of the meal, none has been fully accepted by the industry for one reason or another. In autoclaving if the temperature is not closely regulated the meal is frequently damaged. Halogenated aliphatic hydrocarbons have not been widely accepted due to the poor characteristics of the oil produced, while the use of pigment solvents has not proven economical when used in a large scale operation.

We have found that small amounts of protein containing materials added in an aqueous alkaline solution, followed by a heating operation, give a detoxified meal far superior in feeding properties to meal detoxified in accordance with any of the methods now employed. In our method the alkaline protein solution is added at a relatively small level to the toxic cottonseed material either before or after the extraction of the oil. Following this in plant operation, the cottonseed material is subsequently toasted or desolventized and toasted in conventional equipment to complete the detoxification process of our invention.

It is an object of the present invention to furnish a detoxifying process for altering a normally toxic cottonseed meal to a nontoxic meal which can be safely fed to animals at high levels.

Other objects of this invention will be apparent from the description and claims to follow.

Generally speaking, we contemplate in a process for the preparation of a nutritious animal food from a toxic cottonseed material, the contacting of the material with an alkaline aqueous protein containing solution, and thereafter subjecting the moist material to a heating operation. Either vegetable or animal alkaline protein solutions may be employed. In our preferred process we add an alkaline corn steep liquor (concentrated corn steep water, a by-product of the corn wet-milling industry) to the toxic material and, following this, subject the moist material to a conventional toasting or desolventizing and toasting operation.

While it has been generally thought in the past that cottonseed meal can be rendered less toxic simply by reducing the gossypol content, it has been observed that in many instances there is no apparent correlation between the toxicity of the various samples of cottonseed meal and their content of gossypol or gossypurpurin. See Eagle et al., Arch. Biochem., vol. 18, pp. 271–277 (1948); Eagle et al., Jour. Am. Oil Chem. Soc., vol. 27, pp. 300–303 (1950); Eagle et al., Food Research, vol. 15, pp. 232–236 (1950); Ambrose et al., Jour. Nutrition, vol. 43, pp. 357–370 (1951); and Eagle et al., Food Research, vol. 17, pp. 543–549 (1952). It is our thought that some component of cottonseed pigment glands other than or in addition to gossypol and gossypurpurin is likely responsible for the toxicity of the pigment glands in the case of chickens, rats, guinea pigs, and rabbits. It therefore may not always be sufficient to rely on a chemical analysis which indicates the amount of gossypol in the cottonseed meal when determining the relative toxicity of various cottonseed meals. Thus, while a chemical analysis for gossypol has been the method commonly used for determining the toxicity of cottonseed meal, it is best to conduct animal feeding tests when evaluating any process for detoxifying cottonseed meal. For the foregoing reason we have felt it desirable to establish superiority of our process through conducting suitable animal feeding tests in the evaluation of our detoxified cottonseed meal.

Thus, in order to demonstrate the effectiveness of the present invention in detoxifying a toxic seed meal, a quantity of air-dried hexane-extracted cottonseed flakes which had not been heated during processing was subjected to a series of tests conducted in the following manner.

For the untreated control die (diet I of Table 2) a portion of the above hexane-extracted desolventized and unheated cottonseed flakes was ground and incorporated in a test diet having the specified composition as shown in the following table:

*Table 1*

| | Percent |
|---|---|
| Hexane-extracted cottonseed meal | 67 |
| Cerelose | 14 |
| Swift'ning, animal and vegetable fat mixture | 10 |
| Jones & Foster salt mixture | 4 |
| Wilson 1:20 liver concentrate | 3 |
| Vitamin A and O (2250 U. S. P. A and 300 U. S. P. D per gram) | 1 |
| Yeast AB type | 1 |

When the above diet, which incorporated an untreated meal, was fed to healthy Sprague-Dawley strain rats, all rats died within eight days. This clearly established the extreme toxicity of the untreated meal.

In several concurrent tests using various proteinaceous materials for the detoxification of the cottonseed meal, treatment was carried out in the following manner, the variable in each of the several tests being the particular protein employed:

Sixty-eight grams of the protein (on a dry basis) was blended with 1000 grams of distilled water, with sufficient alkali (in this instance caustic soda) being added to bring the pH to 9.0. The weight was then adjusted to 1800 grams with distilled water. The aqueous solution in each instance was added to 6810 grams of the abovementioned cottonseed flakes. Each of the proteins in the several diets was added at a level of 1 percent based on the weight of the cottonseed meal. The meal was then heated in an atmospheric toaster under agitation with a jacket steam pressure of 15 pounds per square inch (gauge). Cooking or toasting time was for a period of 90 minutes, with the temperature of the toaster after the first 20 minutes being held within the range of 215°–250° F. The meal was then ground in a Mikro-Samplmill through a screen with 1/16" round perforations.

Each of the several alkali protein-treated cottonseed meal was substituted in the test diet (described in Table 1, above) for the untreated meal at the same 67 percent level. None of these protein-treated meals had a toxic effect on the animals, and all of the rats fed these test diets gained weight as shown in Table 2 immediately below:

Table 2

| Diet | No. of Rats | Dietary Variable | Average Starting Weight | 1 wk. | 2 wks. | 3 wks. | 4 wks. | 5 wks. | 6 wks. | 7 wks. | 8 wks. |
|---|---|---|---|---|---|---|---|---|---|---|---|
| I | 15 | Untreated Control | 55 | (All rats died within 8 days) | | | | | | | |
| II | 10 | Dry Heated | 60 | [1] 46 | (All dead within 9 days) | | | | | | |
| III | 15 | Moist Heated | 58 | 77 | 92 | 111 | 130 | 148 | 159 | 161 | 166 |
| IV | 5 | Stick hydrolysate | 55 | 75 | 103 | 133 | 151 | 168 | 198 | 207 | 229 |
| V | 5 | Soya Protein | 55 | 91 | 139 | 175 | 201 | 232 | 269 | 280 | 303 |
| VI | 10 | Condensed Beet Solubles | 55 | 92 | 133 | 172 | 213 | 247 | 271 | 292 | 314 |
| VII | 10 | Casein | 55 | 102 | 151 | 188 | 228 | 262 | 286 | 315 | 328 |
| VIII | 10 | Corn Steep Liquor | 73 | 121 | 161 | 203 | 240 | 274 | 303 | 320 | 342 |

[1] Average of 7 rats; 3 rats dead on seventh day.

In order to establish that the amount of detoxification obtained through use of our process is not solely attributable to the moist heat treatment to which we subjected the meal, a like quantity of distilled water was added to a portion (diet III of Table 2) of the same meal and the moist meal toasted in the same equipment for a period of 90 minutes, employing the same temperature. The meal so treated was ground in the same fashion as above and fed in the aforementioned test diet at the same percentage level. As would be expected, there was some detoxification, although the weight gain of the animals was much less than that obtainable through feeding of the same meal processed in accordance with our invention. It will be noted that those rats fed a diet containing cottonseed (diet II) subjected solely to a dry heat treatment (i. e., no water was added) died within nine days.

To demonstrate the necessity of adding the proteinaceous material to the meal before heating, we have incorporated various proteins in the above test diet at levels of one and two percent of the cottonseed meal. Protein fortification in this manner had no noticeable effect and the rats fed such protein-fortified diets responded to those fed diets containing the untreated cottonseed meal of diet I and, when the protein was added to a diet containing a moist heat treated meal, the same as diet III.

The results obtained upon feeding the cottonseed meal treated in various ways and incorporated in the rat diets at the same 67 percent level (see Table 2) strikingly illustrate the advantages to be gained in the practice of our invention. It will be observed that the diets containing hexane-extracted cottonseed meal treated with small amounts of "cornsteep liquor" solution and casein proved to be the superior diets of the several tests. The tests were continued for a period of eight weeks during which time the rats were weighed at least twice weekly. From the weekly body weights for the rats fed the test diet (diet III) containing cottonseed meal subjected to a distilled water treatment only (i. e., with no protein added), it is clear that the meal so treated is only partially detoxified because the gain in weight is less than half of that evidenced at the end of the eighth week by the rats fed the diet containing a meal subjected to the treatment with the alkaline "corn steep liquor." In the instance of the distilled water treated meal, the gain of weight evidenced at the end of the eight-week period was 108 grams, while in the case of the corn steep liquor treated meal the increase in weight was 269 grams.

Also shown in Table 2 are the body weight data on rats which were fed the same test diet formulation of Table 1 but in which the untreated meal was replaced by a like percentage of the meal treated with the following additional protein containing materials placed in a dilute alkaline solution in the manner described above and at one percent level: soy protein, stick hydrolysate (a concentrated water-soluble mixture from the wet rendering of animal fatty tissues), and condensed beet solubles (a product resulting after partial removal of glutamic acid from the filtrate obtained in the process of recovering sugar from beet molasses). The various proteins of the several tests were added in an amount to constitute 1 percent (on a dry basis) of the cottonseed meal being treated.

As will be observed, the best vegetable proteinaceous material employed proved to be corn steep liquor closely followed by condensed beet solubles. Corn steep liquor is readily available and may be used economically on a plant scale in our process. Commercially available corn steep liquor contains 50 percent protein. In each of the above tests the alkalinity of the protein solution was adjusted to a pH of 9 through the addition of the necessary amount of sodium hydroxide to the aqueous protein.

Potassium hydroxide is another base that may be conveniently used. In another series of tests, we employed level of 1 percent (based on the solids in the corn steep liquor to a pH of 9. The corn steep liquor which contains approximately 50 percent solids was added at a level of 1 percent (based on the solids in the corn steep liquor) to the toxic cottonseed meal. This series of tests was conducted in the manner described in conjunction with the series of tests set forth in Table 2. Here again all of the rats fed the untreated control died within ten days. At the conclusion of the fourth week the group of rats fed the diet containing cottonseed meal treated with the corn steep liquor had an average weight of 210 grams. The rats fed a diet incorporating meal subjected to the conventional moist heat treatment had an average weight of 198 grams.

The optimum pH for most protein falls within the range of 8–10.5. The pH may be varied to obtain the best results for the particular protein being used, and generally in alkalinity which will effectively disperse the proteinaceous material in solution is satisfactory. High pH values (above about 10.5) are to be avoided to forestall the partial breakdown of the protein.

The protein may be added to the cottonseed material at varying low levels. Proteins added at levels less than one per cent may be used in detoxification with somewhat decreasing efficiency. The upper level appears to be limited principally by a cost consideration. However, in our work levels of one and two percent proved satisfactory for all proteins investigated. There is apparently no critical temperature range for the heating operation; however, it should be understood that heat is necessary to effect detoxification.

In another series of tests rations were fed to baby chicks, the variable in the diets again being cottonseed meal which was incorporated at a level of 17.5 percent, with the balance of the diet being as follows:

|  | Percent |
|---|---|
| Ground milo | 28.0 |
| Ground yellow corn | 25.5 |
| Soybean oil meal | 17.5 |
| Dehydrated alfalfa meal | 3.0 |
| Fish meal | 2.0 |
| Steamed bone meal | 2.0 |
| Dried whey | 2.0 |
| Ground oyster shell | 1.5 |
| Iodized salt | 0.5 |
| Aurofac | 0.5 |

Three groups of chicks were used in the test with 19 chicks in group I, 20 chicks each in groups II and III. The chicks of all groups had an average starting weight of 63 grams. The feeding test was conducted for a period of 9 weeks. The chicks comprising group I were fed a diet containing an untreated toxic cottonseed meal. At the end of the 9-week period these chicks had an average weight of 465 grams. The chicks making up the second group were fed a diet having as its variable cottonseed meal which had been subjected simply to the conventional moist heat treatment as described above in the rat test. The chicks of this group had an average weight of 1186 grams at the end of the feeding period. Group III had incorporated in its diet an alkaline soya protein treated cottonseed meal processed in accordance with the method of the invention. These chicks on completion of the ninth week had an average weight of 1208 grams. The aqueous alkaline soya solution was adjusted to a pH of 9. It will be seen from these figures that the alkaline protein treated meal was detoxified to a degree considerably greater than that possible with the conventional moist heat treatment.

In plant operation we have learned that the alkaline protein may be added at any point (either before or after oil extraction) where good distribution can be had and whereafter the treated material will receive sufficient heat to permit the chemical reaction or combination to occur. Conventional toasting of the meal provides adequate heat.

The alkaline protein solutions may be added to the whole meats after the decorticating operation. It is felt that the mechanical rolling afforded these meats helps substantially in the distribution of the treating material. It has been found equally satisfactory to add the solution in the form of an atomized spray, after the rolling operation, to the flaked cottonseed meats. No difficulty was noticed in the later solvent extraction of the oil. Addition may be made during the desolventizing operation which follows the solvent extraction of the oil. Since the oil has been substantially removed at this point, it is believed that better penetration of the chemicals into the matrix of the flake is obtained. However, there is a tendency for the meal to ball up, making the addition at this point not as desirable from an operating point of view. In summary, the alkaline protein solution may be added at any point where the chemical can satisfactorily penetrate the cottonseed, providing such addition is followed by a heating operating to effect the detoxification.

While the examples have employed a hexane-extracted cottonseed meal, our process may be employed to lessen the toxicity of any meal, whether solvent-extracted with hexane or other hydrocarbon solvents, or with chlorinated hydrocarbon solvents or with other meal having a degree of toxicity which prevents its being fed to animals or which lessens its effectiveness as a feed.

Obviously, many modifications and variations of the invention as hereinbefore set forth may be made without departing from the spirit and scope thereof, and therefore only such limitations should be imposed as are indicated in the appended claims.

We claim:

1. In a process for the preparation of an animal food from cottonseed material containing toxic components, the steps of contacting said cottonseed material with an added alkaline aqueous solution of a protein containing material, the pH of the solution being within the range of 8–10.5, and heating the moist material to render the toxic components thereof substantially nontoxic.

2. In a process for the preparation of an animal food from cottonseed material containing toxic components, the steps of contacting said cottonseed material with an added aqueous alkaline vegetable protein solution, the pH of the solution being within the range of 8–10.5, and thereafter subjecting the moist material to a heating operation whereby the toxic components of said material are rendered substantially nontoxic.

3. In a process for the preparation of an animal food from cottonseed material containing toxic components, the steps of contacting said cottonseed material with an added aqueous alkaline animal protein solution, the pH of the solution being within the range of 8–10.5, and thereafter subjecting the moist material to a heating operation whereby the toxic components thereof are rendered substantially nontoxic.

4. In a process for the preparation of an animal food from cottonseed material containing toxic components, the steps of contacting said cottonseed material with an aqueous alkaline soya protein solution, the pH of the solution being within the range of 8–10.5, and thereafter subjecting the moist material to a heating operation whereby the toxic compounds of said material are rendered substantially nontoxic.

5. In a process for the preparation of an animal food from cottonseed material containing toxic components, the steps of contacting said cottonseed material with an alkaline corn steep liquor, the pH of the solution being within the range of 8–10.5, and thereafter subjecting the moist material to a heating operation whereby the toxic components of said material are rendered substantially nontoxic.

6. In a process for the preparation of an animal food from cottonseed material containing toxic components, the steps of contacting said cottonseed material with an aqueous alkaline solution of condensed beet solubles, the pH of the solution being within the range of 8–10.5, and thereafter subjecting the moist material to a heating operation whereby the toxic components of said material are rendered substantially nontoxic.

7. In a process for the preparation of an animal food from cottonseed material containing toxic components, the steps of contacting said cottonseed material with an aqueous alkaline casein solution, the pH of the solution being within the range of 8–10.5, and thereafter subjecting the moist material to a heating operation whereby the toxic components thereof are rendered substantially nontoxic.

8. In a process for the preparation of an animal food from cottonseed material containing toxic components, the steps of contacting said cottonseed material with an alkaline stick solution, the pH of the solution being within the range of 8–10.5, and thereafter subjecting the moist material to a heating operation whereby the toxic components thereof are rendered substantially nontoxic.

References Cited in the file of this patent

UNITED STATES PATENTS

| 1,553,634 | Sawyer | Sept. 15, 1925 |
| 2,551,581 | Bonotto | May 8, 1951 |